(12) United States Patent
Shoaib et al.

(10) Patent No.: US 7,152,180 B2
(45) Date of Patent: Dec. 19, 2006

(54) CONFIGURABLE RELIABLE MESSAGING SYSTEM

(75) Inventors: Shahid Shoaib, San Jose, CA (US); Nayeem Islam, Palo Alto, CA (US)

(73) Assignee: NTT DoCoMo, Inc., Tokyo (JP)

( * ) Notice: Subject to any disclaimer, the term of this patent is extended or adjusted under 35 U.S.C. 154(b) by 521 days.

(21) Appl. No.: 10/313,265

(22) Filed: Dec. 6, 2002

(65) Prior Publication Data

US 2004/0111652 A1    Jun. 10, 2004

(51) Int. Cl.
*G06F 11/00* (2006.01)

(52) U.S. Cl. .......................... 714/4; 709/206; 370/216

(58) Field of Classification Search ...................... None
See application file for complete search history.

(56) References Cited

U.S. PATENT DOCUMENTS

| | | | | |
|---|---|---|---|---|
| 5,410,650 | A | * | 4/1995 | Sasaki et al. ............... 709/250 |
| 5,983,265 | A | * | 11/1999 | Martino, II .................. 709/206 |
| 6,092,096 | A | * | 7/2000 | Lewis ......................... 709/200 |
| 6,138,168 | A | * | 10/2000 | Kelly et al. .................. 719/310 |
| 6,434,605 | B1 | * | 8/2002 | Faulkner et al. ............ 709/213 |
| 6,832,243 | B1 | * | 12/2004 | Mikalsen et al. ........... 709/206 |
| 6,934,247 | B1 | * | 8/2005 | Bhattal et al. .............. 370/216 |
| 2002/0059275 | A1 | * | 5/2002 | Schofield .................... 707/100 |
| 2004/0008678 | A1 | * | 1/2004 | Matthews et al. .......... 370/389 |

OTHER PUBLICATIONS

Ben Schneiderman, *Designing The User Interface: Strategies for Effective Human Computer Interaction*, Addison Wesley Longman, 1998, pp. 71-80.

E. N. Elnozahy, D. B. Johnson and Y. M. Wang, *A Survey of Rollback-Recovery Protocols in Message-Passing Systems*, Technical Report CMU-CS-960181, Carnegie Mellon University, 1996. http://citeseer.nj.nec.com/elnozahy96survey.html.

*Java Message Service, API for accessing enterprise messaging systems from Java Programs, Version 1.1*, Sun Microsystems, Apr. 12, 2002. http://java.sun.com/Download5.

Duncan Mackenzie, *Reliable Messaging with MSMQ and .NET*, Microsoft Developer Network, 2002. http://msdn.microsoft.com/library/default.asp?url=/library/en-us/dnbda/html/bdadotnetasync2.asp.

*IBM MQSeries Overview*, IBM, 2002. http://www-3.ibm.com/software/ts/mqseries/library/whitepapers/mqover/.

A. S. Tanenbaum and M. V. Steen, *Distributed Systems: Principles and Paradigms*, Prentice Hall, 2002, pp. 28-31, 36-37, 100-105, 362-363, 376-377.

(Continued)

*Primary Examiner*—Robert W Beausoliel
*Assistant Examiner*—Philip Guyton
(74) *Attorney, Agent, or Firm*—Blakely, Sokoloff, Taylor & Zafman LLP

(57) ABSTRACT

In one aspect of the invention, a configurable reliable messaging system is provided. The configurable reliable messaging system comprises a communication subsystem capable of configurably transmitting and receiving a message across a network using at least one of a plurality of network links, a plurality of internet protocols and a plurality of transport protocols. The configurable reliable messaging system also comprises a reliability subsystem capable of configurably logging the message, detecting a plurality of failures, notifying a remote entity interconnected with the configurable reliable messaging system via the network of the plurality of failures, and recovering from the plurality of failures. In addition, the configurable reliable messaging system comprises a control module capable of configuring the communication subsystem and the reliability subsystem based on a set of input parameters.

22 Claims, 7 Drawing Sheets

OTHER PUBLICATIONS

A. Sears, J. S. Jacko and M. S. Borella, *Internet Delay Effects: How Users Perceive Quality, Organization, and Ease of Use of Information*, 1997. http://www.acm.org/sigchi/chi97/proceedings/short-talk/als2.htm.

S. Michiels, F. Matthijs, D. Walravens and P. Verbaeten, *DiPS: A Unifying Approach for Developing System Software*, The 8th Workshop on Hot Topics in Operating Systems (HotOS-VIII). May 2001.

* cited by examiner

CONFIGURABLE RELIABLE MESSAGING SYSTEM

RELATED APPLICATION

This application is related to application Ser. No. 10/179,994, filed Jun. 24, 2002, entitled "System and Method for Making Mobile Applications Fault Tolerant," naming as inventors Nayeem Islam and Shahid Shoaib, and application Ser. No. 10/243,083, filed Sep. 13, 2002, entitled "Method For Dynamically Switching Fault Tolerance Schemes," naming as inventors Shahid Shoaib and Nayeem Islam.

FIELD OF THE INVENTION

The present invention relates generally to fault tolerant distributed computing systems, and in particular, to a reliable messaging system for distributed systems that is self configurable to provide various levels of fault tolerance.

BACKGROUND

The successful completion of applications depends on the fault free operation of critical system components. In distributed computing systems, these critical system components typically include application processes, devices (clients or servers) on which application processes execute and the communication mechanism used to communication between them. However, any of these components may fail during operation. Such failures may have implications for a user ranging from mere annoyance to significant financial losses. Therefore, from a user's perspective, there is a need for system reliability. Reliability is the property of a computing system that allows it to run continuously without crashing. In situations where it may not be possible to avoid all component failures, reliability from a user perspective can be provided by masking these failures. Fault tolerance allows a system to run and offer its services to a user even in the presence of failures.

Messaging is considered a key communication mechanism in distributed systems, where it is a popular choice for applications that require a high degree of reliability, e.g. web services, remote procedure calls and e-commerce transactions. Messaging allows applications to communicate to each other via message passing, ensuring that messages are delivered according to application specified delivery semantics, such as at most once, at least once and exactly once.

A message-based communication system that is fault tolerant, referred to as a reliable messaging system, ensures the reliable delivery of messages according to specified delivery semantics despite device (client or server) and network failures. This is accomplished by making the reliable messaging system fault tolerant to various types of failures, which may require implementing different fault tolerance schemes for fault detection or recovery. Additionally, a reliable messaging system may support asynchronous operation, which imposes no limit on the time it takes to send or receive messages over a network. Asynchronous operation allows interconnected devices to communicate with each other even if one of the devices is temporarily unavailable using point to point messaging or a centralized messaging or queuing server.

Fault tolerance usually requires some sort of redundancy, e.g., an application may have to save its state periodically to stable storage in order to ensure that it can recover from failures. Research has shown that there is a significant trade-off between the level of fault tolerance, which includes reliability guarantees and recovery speed, and the system performance during failure free operation. This trade-off results from the varying amounts of computing overhead associated with message logging, fault detection and recovery operations for different fault tolerance schemes. Accordingly, an application may wish to specify precise fault tolerance and performance requirements for a reliable messaging system. These requirements may vary over the course of execution of an application and may differ among applications.

In addition, reliable messaging systems will need to operate in computing environments that may have great heterogeneity among the networks, applications/services and devices forming part of these environments. For example, a wireless environment may include changing networks, changing network conditions, including frequent disconnections, asymmetric networks and networks with unpredictable delay and loss characteristics. In addition, various applications executing within a wireless environment may impose changing service characteristics and service requirements for reliability and fault tolerance. Also, wireless environments may include heterogeneous devices having different processing power, changing load, storage, memory and battery resources.

Traditional techniques for implementing reliable messaging for distributed systems have primarily focused on static reliable messaging systems. These systems are unable to adapt to changing conditions in a heterogeneous environment. Known reliable messaging systems can provide only limited levels of fault tolerance and rely on fixed transport protocols, usually the Transport Control Protocol (TCP), which may not be optimized for a heterogeneous or wireless environment.

Therefore, there is a need for an improved reliable messaging system that can provide dynamic re-configurability and fault tolerance in a heterogeneous computing environment.

SUMMARY

In one aspect of the invention, a configurable reliable messaging system is provided. The configurable reliable messaging system comprises a communication subsystem capable of configurably transmitting and receiving a message across a network using at least one of a plurality of network links, a plurality of internet protocols and a plurality of transport protocols. The configurable reliable messaging system also comprises a reliability subsystem capable of configurably logging the message, detecting a plurality of failures, notifying a remote entity interconnected with the configurable reliable messaging system via the network of the plurality of failures, and recovering from the plurality of failures. In addition, the configurable reliable messaging system comprises a control module capable of configuring the communication subsystem and the reliability subsystem based on a set of input parameters.

In another aspect of the invention, a method for configuring a reliable messaging system is provided. The reliable messaging system includes a control module. The reliable messaging system also includes a communication subsystem having communication components, which are capable of configurably transmitting and receiving a message across a network using at least one of a plurality of network links, a plurality of internet protocols and a plurality of transport protocols. The reliable messaging system further includes a reliability subsystem having reliability components, which are capable of configurably logging the message, detecting a plurality of failures, notifying a remote entity interconnected with the configurable reliable messaging system via the network of the plurality of failures, and recovering from the plurality of failures. The method comprises using the control module, selecting a group of the reliability components for an implementation of the reliable messaging system based on a set of input parameters. The method also comprises instantiating the communication components and the selected group of reliability components. In addition, the method comprises using the control module, configuring the communication components and the selected group of reliability components. Furthermore, the method comprises using the control module, determining an order for routing messages between the set of components based on the set of input parameters.

DETAILED DESCRIPTION OF THE DISCLOSED EMBODIMENTS

Reference will now be made in detail to the present disclosed embodiments with reference to the accompanying drawings.

Figure 1:
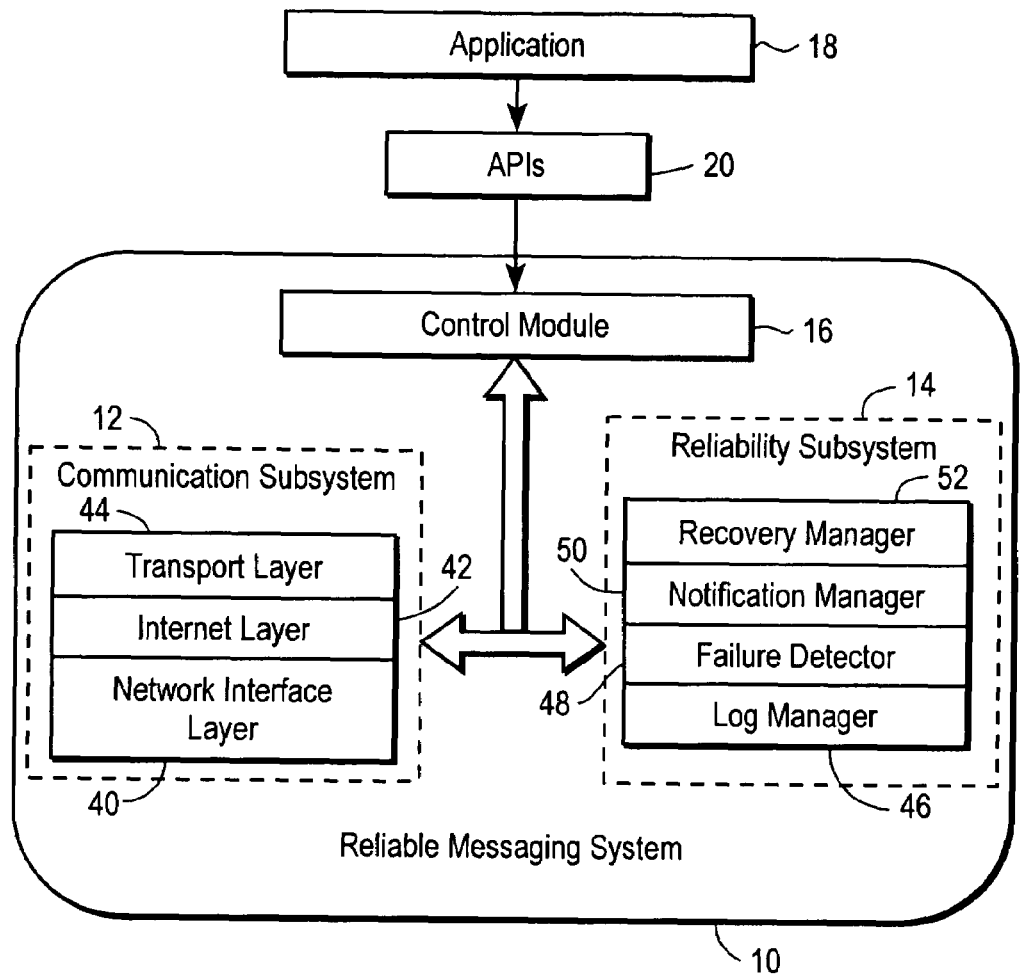
FIG. 1 is a block diagram of an embodiment of a configurable reliable messaging system according to the present invention.

FIG. 1 illustrates an embodiment of a configurable reliable messaging system 10 according to the present invention, which utilizes a component based software architecture to implement reliable messaging. In particular, the reliable messaging system 10 includes a communication subsystem 12, a reliability subsystem 14, and a control module 16. The reliable messaging system 10 interfaces with an application program 18 using a set of APIs 20 via the control module 16.

Figure 2:
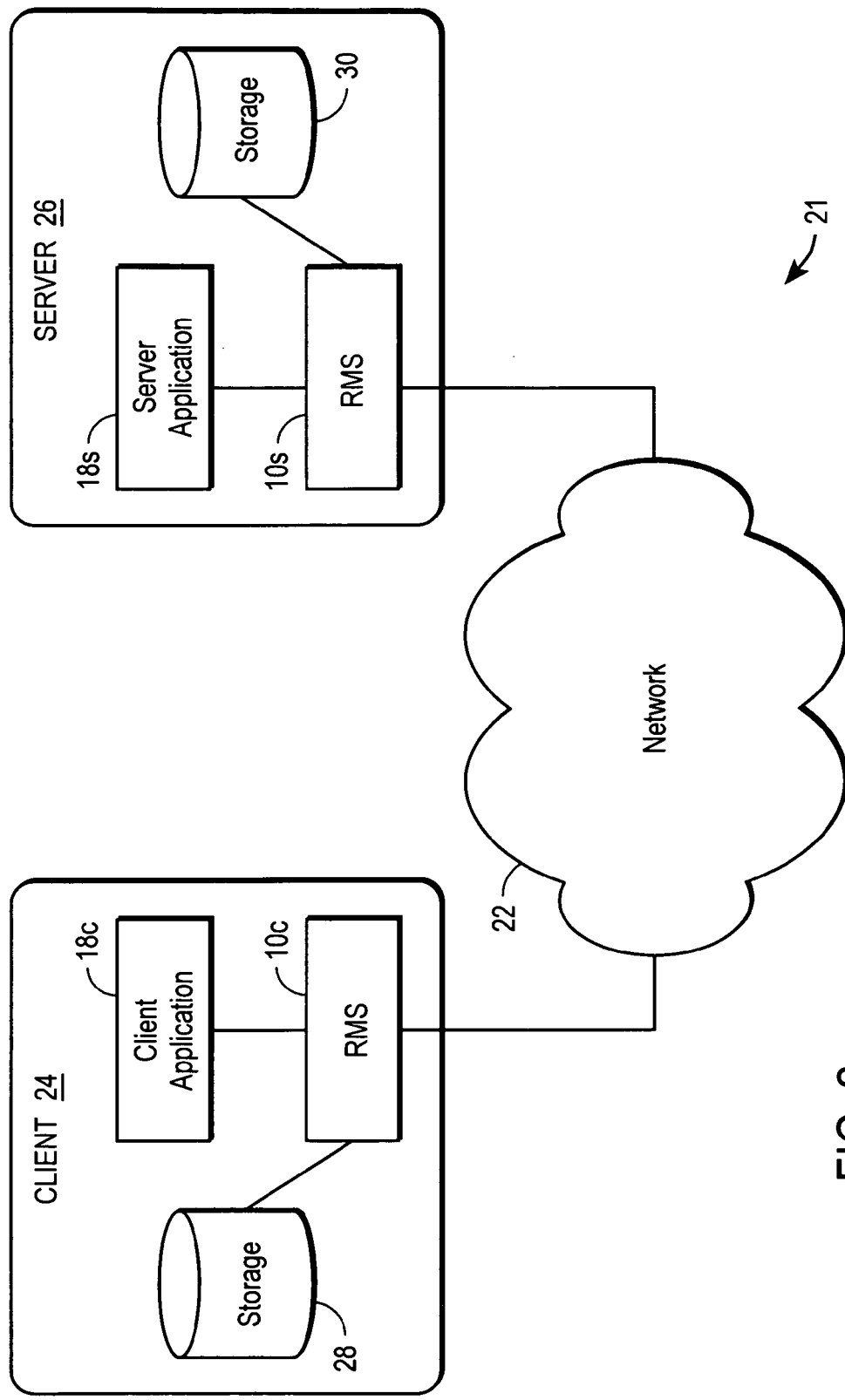
FIG. 2 is a block diagram of an exemplary distributed system for implementing the configurable reliable messaging system of FIG. 1.

The application program 18 uses the reliable messaging system 10 to communicate with other remote entities. For instance, the reliable messaging system 10 can execute in a distributed system, as shown in FIG. 2. A distributed system is a group of computing devices interconnected with a communication network which function together to implement an application. The distributed system 21 of FIG. 2 includes an access network 22 connected to a client device 24 and a server device 26. A client application 18c, such as a web browser responsible for presenting the data on the client 24, interfaces with a reliable messaging system ("RMS") 10c that executes on the client 24. A server application 18s, such as a database engine that manages data storage and retrieval on the server 26, interfaces with the reliable messaging system 10s that executes on the server 26. The client and server applications 18c and 18s can communicate with each other by sending and receiving messages across the access network 22 via reliable messaging systems 10c and 10s. In addition, the client 24 includes a persistent storage 28 and the server 26 includes a persistent storage 30 to allow the reliable messaging systems 10s and 10c to perform message logging operations.

While the distributed system 21 of FIG. 2 illustrates a client-server model, it should be understood that this model is meant to be illustrative, rather than limiting. A configurable reliable messaging system according to the present invention can execute in other types of distributed computing environments as well. For example, multiple client devices may communicate to each other via the reliable messaging system 10 of FIG. 1 in a peer-to-peer or adhoc networking mode and multiple server devices also may communicate to each other via the reliable messaging system 10 for back end processing.

As described in further detail below, the reliable messaging system 10 of FIG. 1 is self configurable in (i) the selection of the components that comprise the communication subsystem 12 and the reliability subsystem 14, (ii) the specific implementations of the selected components and (iii) the routing of messages between these components. This configurability allows the reliability messaging system 10 to adapt itself in real time to handle different types of applications, networks and devices.

Communication Subsystem

As indicated above, the reliable messaging system 10 of FIG. 1 includes a communication subsystem 12, which is responsible for end-to-end delivery of data. For example, as shown in FIG. 2, the reliable messaging systems 10c and 10s are responsible for delivery of data between the client 24 and the server 26. Referring again to FIG. 1, the components of the communication subsystem 12 include a network interface layer 40, an internet layer 42 and a transport layer 44.

The network interface layer 40 provides access to different physical network links, such as the access network 22 of FIG. 2, for transmitting and receiving data. The network interface layer 40 formats data into network-specific packets. It provides the internet layer 42 with a consistent interface to different types of access networks, such as a wired local access network ("LAN"), cellular network, Bluetooth, IRDA, 802.11b (Wi-Fi) wireless LAN, and General Packet Radio Service (GPRS) mobile telephone network.

The internet layer 42 handles the movement of data across an internet, which is a set of interconnected networks. Specifically, the internet layer 42 provides the ability to transmit data between heterogeneous physical networks that interconnect a source and destination device. For example, the access network 22 of FIG. 2 may include a 802.11B wireless LAN network or a third generation cellular network (UMTS) as part of a hybrid network comprising of different access technologies. The internet layer preferably uses the Internet Protocol ('IP") for routing individual data packets between individual network nodes using an IP addressing scheme. The Internet Protocol can also break up or fragment application messages into smaller manageable data packets called datagrams for transmission across networks that can only handle smaller data packets. The datagrams can then be re-assembled at a destination node to reconstruct the sent messages. The internet layer can further process error and control messages, such as ICMP. However, those skilled in the art will recognize that other types of protocols may be used instead of IP, such as Novell NetWare's IPX.

The transport layer 44 manages the flow of data between the application 18 and the reliable messaging system 10. It performs flow control to slow data transfer in case of limited network bandwidth and verifies the correct delivery of data. If transmission errors or data loss are detected, the transport layer 44 can ask for data to be retransmitted. The transport layer can utilize various transport protocols, including reliable HTTP (HTTPR), which supports reliable messaging, as well as TCP, SCTP, UDP, SMTP, HTTP.

Reliability Subsystem

The reliability subsystem 14 addresses problems related to making the communications subsystem 12 fault tolerant in the presence of network, device and application failures. The reliability subsystem 14 includes a log manager module 46, failure detector module 48, notification manager module 50 and recovery manager module 52.

Log Management

The log manager module 46 takes care of message logging during normal system operation. For example, the log manager module of the reliable messaging system 10c of FIG. 2 can log messages received from the server 26 to the persistent storage 28 on the client 24, while the log manager module of the reliable messaging system 10s can log messages received from the client 24 to persistent storage 30 on the server 26.

Message logging is desirable because fault tolerance is attained by redundancy. The log manager module 46 can execute various logging schemes or algorithms. For example, both the client 24 and the server 26 of FIG. 2 may have multiple options regarding the direction of message logging, including for outgoing messages only, for incoming messages only, or for both directions. In addition, the client 24 may have options for the timing of message logging operations, such as logging messages before sending an outgoing message, after sending an outgoing message or asynchronously. Likewise, the server 26 may log messages before or after delivering an incoming message to the application or asynchronously.

Different logging schemes can have different fault tolerance versus performance trade-offs. No one logging scheme will work best for all applications. In order to meet changing requirements of fault tolerance and performance for the application 18, the log manager module 46 can dynamically switch message logging schemes in real time at the direction of the control module 16, as described in further detail below.

Failure Detection

Referring again to FIG. 1, the failure detector module 48 is used to detect different classes of failures, such as application process failures, client and server device failures, network failures and transport failures. Timely and accurate failure detection facilitates graceful recovery from failures.

As noted above, the failure detector module 48 can detect application process failures. For example, the failure detector module 48 can periodically poll the operating system process table to determine if the application 18 has crashed or fails to respond within a given time period. This behavior will be detected by the failure detector module 48 and will be treated as an application process failure. The failure detector module 48 can also signal to the control module 16 that the application 18 has failed. As described in greater detail further below, the control module 16 can then direct the notification manager module 50 and the recovery manager module 52 to take appropriate steps in order to mask the failure of the application 18.

The failure detector module 48 can also detect local device and remote device failures. In particular, the failure of a local device that executes the reliable messaging system 10 can only be detected locally once the device is turned back on. For example, referring to FIG. 2, the failure detector module of the reliable messaging system 10c may detect that the client 24 (local device) has failed once the client 24 device restarts and a communicating peer, such as the server 26, notifies the client 24 of the client's failure. The server 26 can determine that the client 24 has failed using a timeout mechanism that periodically polls the client 24. Likewise, by periodically polling the server 26, the failure detector module of the reliable messaging system 10c can detect a failure of the server 26 (remote device) once the server has crashed or fails to respond in a given interval. Furthermore, the reliable messaging system 10s can similarly detect a local failure of the server 26 once the server 26 restarts as well as a failure of a remote device, such as client 24, using simple timeout mechanisms.

In addition, network link failures can be detected by the failure detector module 48 of FIG. 1. In particular, the failure detector module 48 can detect whether a network link of the reliable messaging system 10 has crashed or ceases to respond within a given interval to polling requests. Alternatively, the failure detector module 48 can detect a network link failure if the packet loss rate or data transmission delay for the network link increases above a predetermined threshold value. This threshold value may vary for different types of networks and can be specified by the systems deployer.

The failure detector module 48 further can detect a failure at the transport layer 44. A transport protocol is defined to have failed if the network link has not crashed, but the transport protocol itself is giving unacceptable performance. For example, the failure detector module 48 can detect a failure a failure at the transport layer 44 if a network link shows acceptable signal strength above a given signal threshold, but the data transmission delay, or number of retransmissions increases above a predetermined threshold value.

Notification Management

The notification manager module 50 works in conjunction with the failure detector module 48 to notify remote entities that the application 18 has failed. Specifically, once the control module 16 receives notice from the failure detector module 48 that the application 18 has failed, the control module can direct the notification manager module 50 to broadcast a failure notification to particular remote entities. For example, referring to FIG. 2, the notification manager module of the reliable messaging system 10s on the server 26 can notify the reliable messaging system 10c on the client 24 that the application 18s has failed. As described in greater detail further below in connection with the reliability options of Table 1, the application 18 can request which remote entities are notified of its failure.

In addition, the notification manager module 50 can notify remote entities if the failure detector module 48 has detected that a network link or transport has failed. This can be accomplished once the recovery manager 52 has recovered from the network link failure or transport failure in question.

Recovery Management

The recovery manager module 52 of FIG. 1 is responsible for recovery from different types of failures. Different recovery mechanisms may be used by the recovery manager module 52 depending upon the type of failure detected and the logging scheme used by the log manager module 46.

Consequently, the recovery manager module 52 can recover from application process failures. In particular, the recovery manager module 52 will ensure that, if a local application has failed, any incoming messages are delivered to the application after it restarts. Likewise, in case of a remote application failure, the recovery manager module 52 will ensure that any outbound messages are received by the remote application once it restarts. Referring to FIG. 2, if the client application 18c fails for example, the recovery manager module of the reliable messaging system 10c will request that the log manager of the reliable messaging system 10c queue all incoming messages and will ensure that those messages are delivered to the client application 18c once it restarts. If the server application 18s fails, the recovery manager module of the reliable messaging system 10c will request that the log manager of the reliable messaging system 10c queue all outbound messages from the client 24 and will ensure that they are received by the server application 18s once it restarts.

In addition, when the server application 18s has failed, the recovery manager module of the reliable messaging system 10s on the server 26 can notify the client application 18c of alternate servers executing a server application which provides the services requested from application 18s. Also, the recovery manager module of the reliable messaging system 10c on the server 24 can seek an alternate server in response to a notification that the server application 18s has failed.

Referring again to FIG. 1, the recovery manager module 52 can also recover from device failures. In particular, the recovery manager module 52 will ensure that, if a local device has failed, any incoming messages are delivered to a local application once it restarts after the local device itself comes back up. Likewise, in case of a remote device failure, the recovery manager module 52 will ensure that any outbound messages are received by a remote application once it restarts after the remote device itself comes back up.

For example, if the client 24 of FIG. 2 fails, the recovery manager module of the reliable messaging system 10c will ensure any incoming messages are delivered to the client application 18c once it restarts after the client 24 itself comes back up. Likewise, the recovery manager module of the reliable messaging system 10s will ensure that any outbound messages are received by the client application 18c once it restarts after the client 24 itself comes back up. If the server 26 of FIG. 2 fails, the recovery manager module of the reliable messaging system 10s will ensure any incoming messages are delivered to, and the recovery manager module of the reliable messaging system 10c will ensure that any outbound messages are received by, the server application 18s once it restarts after the server 26 itself comes back up.

Alternatively, in case the server 26 has failed, the recovery manager module of the reliable messaging system 10c on the client 24 can find an alternate server connected to the access network 22, which can continue to provide the same services as the crashed server 26. The reliable messaging system 10c will then send outbound messages to the new alternate server instead of the server 26.

Referring again to FIG. 1, the recovery manager module 52 further can recover from a network link failure. In particular, the recovery manager module 52 can select a different access network for communicating with remote entities once a network link failure has been detected by the failure detector 48. The selection criteria for choosing a new access network can be specified by the system deployer.

Additionally, in order to recover from a transport failure, the recovery manager module 52 may select another transport protocol to use for the transport layer 44 once a transport failure has been detected by the failure detector 48. The criteria for selecting an appropriate transport protocol may be specified by the system deployer.

Control Module

The control module 16 provides an interface to the application 18. Generally, the control module 16 provides the application 18 with a core set of application programming interfaces ("APIs") 20 that can be used for communicating with the reliable messaging system 10. In particular, the set of APIs 20 allow the application 18 to specify input parameters for the reliable messaging system 10. The input parameters correspond to different options for performance and fault tolerance of the reliable messaging system 10. As described in greater detail further below, an application 18 may specify different options for performance and fault tolerance for the reliable messaging system 10 in various levels of granularity, such as per message and per message type. In addition, those skilled in the art will recognize that different users may have their own peculiar requirements for fault tolerance and/or performance from a particular application. Therefore, an application may specify different sets of input parameters depending on the identity of a current user or on a per user basis.

Table 1 shows several reliability related options that the application 18 of FIG. 1 may specify for the reliable messaging system 10. The term local application refers to the application 18 and the term local device refers to the device, whether client or server, which executes the application 18. The term remote device refers to a device interconnected to the local device via a network. A remote application is an application that executes on a remote device for providing services requested by the local application. The term logging server refers to a dedicated remote device that is capable of logging messages. Where an entry for an option is designated by the term "X," a particular value may be specified corresponding to a range of values available for the option.

As shown in Table 1, the application 18 may choose various types of failures to be detected by the reliable messaging system 10, including local and remote application failures, remote device failures, and network failures, including network link and transport failures. The application 18 also may specify whether the reliable messaging system 10 should notify remote entities of particular types of failures as well as a destination for any such notification. The application 18 may further choose whether it wishes to recover from local and remote application failures, local and remote device failures, and network failures, including network link and transport failures. In addition, the application 18 may request a device for logging messages, including the local device, a remote device, and a centralized network logging server.

TABLE 1

Reliability Options

| | Failure Detection | Recovery | Notification (requested, destination) | Message Logging |
|---|---|---|---|---|
| Local Application | Y/N | Y/N | Y/N, X | N/A |
| Remote Application | Y/N | Y/N | Y/N, X | N/A |
| Local Device | Y/N | Y/N | Y/N, X | Y/N |
| Remote Device | Y/N | Y/N | Y/N, X | Y/N |
| Logging Server | N/A | N/A | N/A | Y/N |
| Network Link | Y/N | Y/N | Y/N, X | N/A |
| Transport | Y/N | Y/N | Y/N, X | N/A |

Furthermore, the application 18 can specify values for reliability options of Table 1 on a per message basis or a per message type basis. In particular, the application 18 can specify different recovery and failure detection options for individual messages or for each class of messages handled by the reliable messaging system 10.

The following sample APIs may be used to by an application to specify input parameters corresponding to the reliability options shown in Table 1.

```
RELIABILITYPARAMS{
  FAILUREDETECTIONPARAMS failureDetectionPARAMS;
  NOTIFICATIONPARAMS notificationPARAMS;
  LOGGINGPARAMS loggingPARAMS;
  RECOVERYPARAMS recoveryPARAMS;
}
FAILUREDETECTIONPARAMS {
  BOOL localAppFailure;
  BOOL remoteAppFailure;
  BOOL localDeviceFailure;
  BOOL remoteDeviceFailure;
  BOOL linkFailure;
  BOOL transportFailure;
}
NOTIFICATIONPARAMS {
  BOOL localAppFailure;
  BOOL remoteAppFailure;
  BOOL localDeviceFailure;
  BOOL remoteDeviceFailure;
  BOOL linkFailure;
  BOOL transportFailure;
  Destination notificationDestination;
}
LOGGINGPARAMS {
  BOOL localLog;
  BOOL remoteLog;
  BOOL dualLog;
  Destination additionalLogDestination;
}
RECOVERYPARAMS {
  BOOL localAppFailure;
  BOOL localDeviceFailure;
  BOOL remoteAppFailure;
  BOOL remoteDeviceFailure;
  BOOL linkFailure;
  BOOL transportFailure;
}
```

Table 2 shows several performance options that the application 18 may specify for the reliable messaging system 10. In particular, the application 18 may set threshold values for the mean ($M(T)$) and variance ($V(T)$) of wait times for user interface events at the application 18. Wait times measure the time intervals that the application 18 must wait for a system response after issuing a request. Accordingly, the threshold values for $M(T)$ and $V(T)$ relate to acceptable response times for fulfilling a user's request. Furthermore, the application 18 may specify the threshold values for the mean and variances of wait times per message or per message type.

TABLE 2

Performance Options

|  | $M(T)$ (ms) | $V(T)$ (ms) |
|---|---|---|
| Application | X | X |

The following sample APIs may be used to the application 18 to specify input parameters corresponding to the performance options discussed above.

```
PERFORMANCEPARAMS {
  long WaitTimeThreshold;
  long WaitTimeVariance;
}
```

Table 3 shows several network stack options that the application 18 may customize for the reliable messaging system 10. Specifically, the application 18 may specify a network link to be accessed locally by the network interface layer 40, a protocol to be used locally by the internet layer 42 and a transport protocol to be used locally by the transport layer 44 of the reliable messaging system 10. The application 18 can specify each of these network stack options per message or per message type.

TABLE 3

| | Network Stack Options | | |
|---|---|---|---|
| | Transport (transport protocol) | Internet (Layer 3 protocol) | Link (Link type) |
| Application | X | X | X |

The following sample APIs may be used to by the application 18 to specify input parameters corresponding to the network stack options discussed above. The "autoSwitch" parameters allow the application 18 to specify that the reliable messaging system 10 is permitted to switch from the requested transport layer protocol, the internet layer protocol and the network link if necessary.

```
COMMPARAMS {
TRANSPORTPARAMS transportPARAMS
L3PARAMS l3PARAMS
LINKPARAMS linkPARAMS
}
TRANSPORTPARAMS {
tProtocol primaryTransportProtocol;
tProtocol alternateTransportProtocol;
BOOL autoSwitchTransport;
}
L3PARAMS {
L3Protocol primaryInternetLayerProtocol;
L3Protocol alternateInternetLayerProtocol;
BOOL autoSwitchInternet;
}
LINKPARAMS {
accessNetwork primaryLink;
accessNetwork alternateLink;
BOOL autoSwitchLink;
}
```

Table 4 shows several delivery options for the reliable messaging system 10 that the application 18 may select from. For example, the application 18 may specify that it requires at least once, at most once or exactly once delivery of messages. It also may specify different delivery options per message type or per message.

TABLE 4

Delivery Options

|  | At least once | At most once | Exactly once |
|---|---|---|---|
| Application | Y/N | Y/N | Y/N |

Table 5 shows several synchrony options that the application 18 may specify for the reliable messaging system 10. For example, the application 18 may select either asynchronous or synchronous operation of the reliable messaging system 10. These options may be selected by the application 18 per message type or per message.

TABLE 5

Synchrony Options

|  | Async | Sync |
|---|---|---|
| Application | Y/N | Y/N |

In addition, the following sample APIs may be used to by the application 18 to specify input parameters corresponding to the delivery and synchrony options discussed above.

```
DELIVERYPARAMS {
BOOL AsyncOperation;
deliverySemantics Semantics;
}
```

In order for the application 18 to configure the reliable messaging system 10 using the illustrative API structures described above, the following control APIs may be utilized. In particular, the following "get" method calls can be used by an application 18 to retrieve current values for the input parameters of the reliable messaging system 10 corresponding to options for performance and fault tolerance, while "set" method calls can be used to specify new values for the input parameters:

```
reliabilityPARAMS getReliabilityOptions (configType)
int setReliabilityOptions (configType, reliabilityPARAMS)
commPARAMS getCommOptions (configType)
int setCommOptions (configType, commPARAMS)
deliveryPARAMS getDeliveryOptions (configType)
int setDeliveryOptions(configType, deliveryPARAMS)
configType {
MessageType perMessageType;
Message perMessage;
}
```

The application 18 also can configure the reliable messaging system 10 using the "sendMessage" method call for requesting that the reliable messaging system send messages and the "recvMessage" method call for retrieving messages received by the reliable messaging system.

```
int sendMessage(Destination msgDest,
    Message outBuffer,
    RELIABILITYPARAMS reliabilityPARAMS optional,
    COMMPARAMS commPARAMS optional,
    DELIVERYPARAMS deliveryPARAMS optional)
```

```
int recvMessage(Source from optional,
    Message outBuffer,
    RELIABILITYPARAMS reliabilityPARAMS optional,
    COMMPARAMS commPARAMS optional,
    DELIVERYPARAMS deliveryPARAMS optional)
```

Configurabilty

The set of APIs 20 provide flexibility in how the reliable messaging system is configured. Based on the reliability, performance, network, synchrony, and delivery options specified by the application 18, the control module 16 can instantiate and configure a customized implementation of the reliable messaging system 10. In particular, the control module 16 can select the components of the communication and reliability subsystems 12 and 14 for a particular instantiation of the reliable messaging system 10 depending on the fault tolerance and performance options specified by the application 18.

Figure 3:
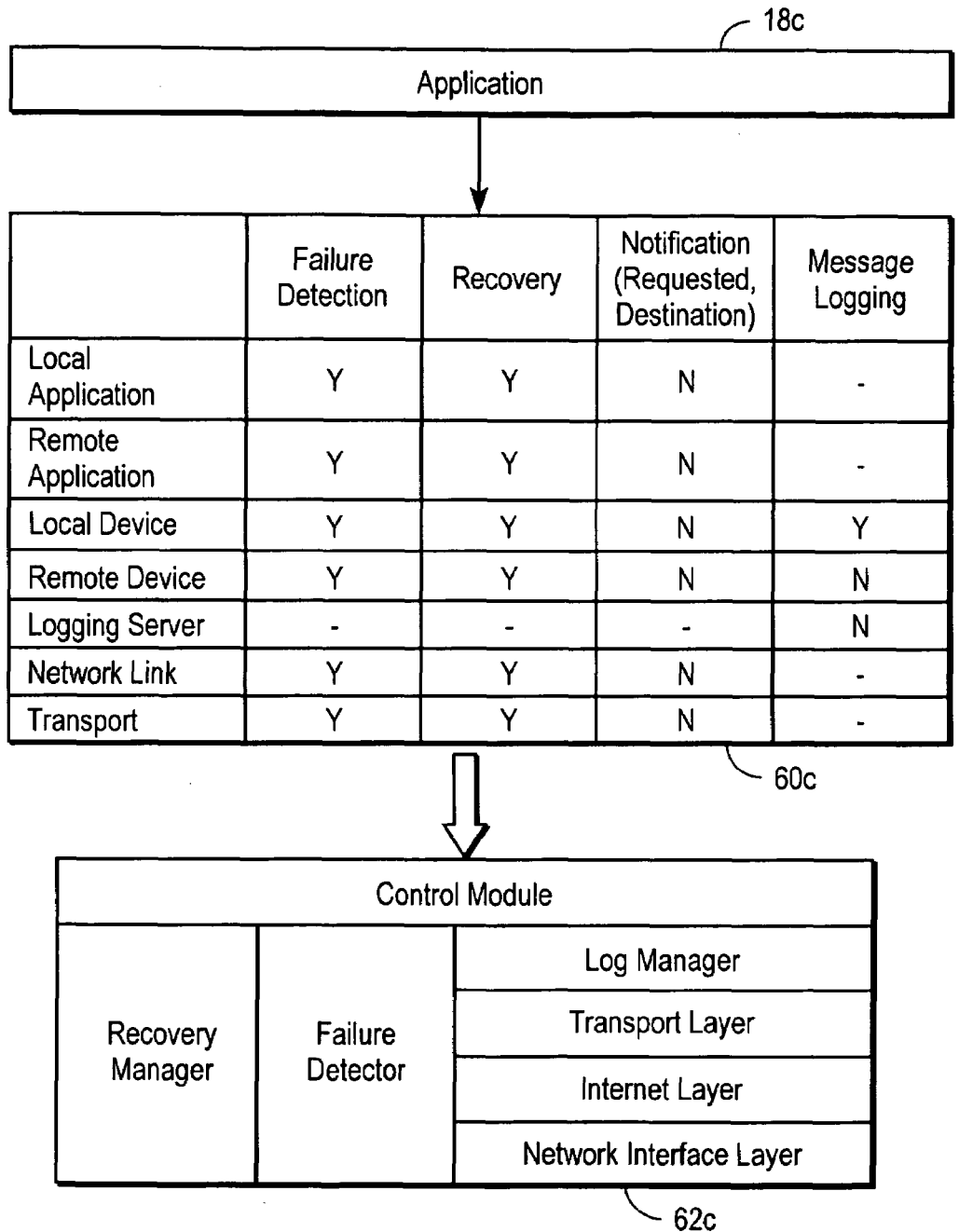
FIG. 3 is a block diagram showing an illustrative instantiation of the configurable reliable messaging system of FIG. 1 based on a first set of input parameters.

FIG. 3 illustrates an exemplary set of input parameters 60c corresponding to the reliability options of Table 1 that the application 18c of FIG. 2 can specify. Specifically, input parameters 60c specify that the application 18c wants to be able to detect and recover from local application (client application 18c) and remote application (server application 18s) failures, remote device (server 26) failures, and network (network 22) failures, including network link and transport failures. The application 18c also wants message logging to be done on the remote device (server 26), but not on the local device (client 24). Furthermore, the application 18c does not want to notify any remote entities of the failures detected by the reliable messaging system 10c. Based on these input parameters 60c, the control module 16c of the reliable messaging system 10c selects and dynamically instantiates an implementation 62c of the reliable messaging system 10c, as shown in FIG. 3. In the implementation 62c, the notification manager module of the reliable messaging system 10c has not been instantiated and is not part of the implementation because the application 18c did not request failure notification as a reliability option.

Figure 4:
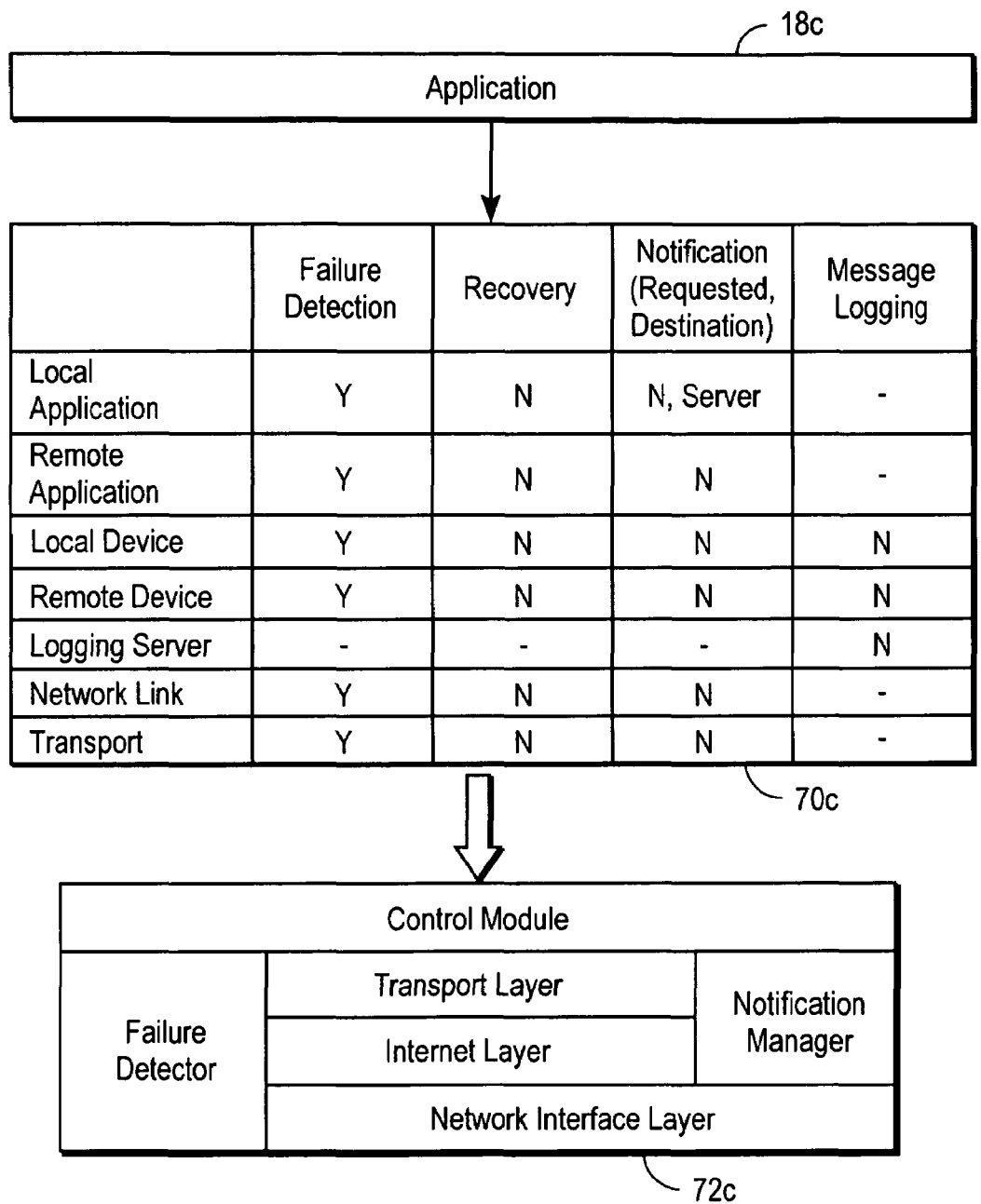
FIG. 4 is a block diagram showing another illustrative instantiation of the configurable reliable messaging system of FIG. 1 based on a second set of input parameters.

FIG. 4 illustrates another instance 72c of the reliable messaging system 10c. In this instance, the application 18c has requested failure detection and notification but no recovery and message logging. Accordingly, the control module 16c of the reliable messaging system 10c instantiates the notification manager module 50c and the failure detector module 48c of the reliable messaging system 10c. However, the recovery manager module and the log manager module of the reliable messaging system 10c have not been instantiated and are not part of the instance 72c of the reliable messaging system 10c.

In another example, the client application 18c of FIG. 2 can specify that it will not tolerate mean wait times above a predetermined threshold value for M(T), according to the performance options of Table 2. However, the application 18c can also request message logging on both the client 24 and the server 26 according to the options shown in Table 1 in order to ensure that messages are delivered in despite failures of the network 22, client 24 and server 26. In this case, if the client 24 determines that the mean wait time for the application 18c are above the predetermined threshold value for M(T), it can attempt to lower it by sacrificing part of the requested fault tolerance. Specifically, if the client 24 can determine whether the computational cost of logging messages is lower at the server 26 than at the client 24, the control module 16c of the reliable messaging system 10c can ignore the client message logging option specified by the application 18c, such that only the instantiation of the reliable messaging system 10s at the server 26 will include a log manager module. By refusing to instantiate a log manager module at the client 24, the control module 16c can lower the overall response time for responding to a user request from the client 24, thereby lowering the mean wait time.

These examples illustrate how the architecture of the reliable messaging system 10 permits the control module 16 to select different components for an instance of the reliable messaging system based on application specified input parameters corresponding to the reliability and performance options shown in Tables 1 and 2.

In addition, once selected components of the reliable messaging system 10 have been instantiated, the control module 16 of FIG. 1 can configure these components based on the specified options for performance and fault tolerance. In particular, the control module 16 can determine which protocols or algorithms to execute for the instantiated components. Also, the control module 16 can dynamically switch different algorithms or protocols running in one or more components at runtime based on the input parameters specified by the application 18.

For example, the control module 16 can select different message logging schemes for log manager module 46 based on the threshold values for the mean and variances of wait times specified by the application 18 for the performance options shown in Table 2, as disclosed in application Ser. No. 10/243,083, entitled "METHOD FOR DYNAMICALLY SWITCHING FAULT TOLERANCE SCHEMES," naming as inventors Shahid Shoaib and Nayeem Islam, filed Sep. 13, 2002.

Likewise, the control module 16 can select different transport protocols for the transport layer 44 and different network links for the network interface layer 40 based on the network, delivery and synchrony options specified by the application 18. Additionally, if the application 18 fails to specify a transport protocol, the control module 16 may select a protocol for the transport layer 44 based on the type of network link specified. Alternatively, the application 18 can choose to become completely independent of communications semantics, specifying only the data that it wants to send, the intended destination, any delivery semantics and the type of reliability and fault tolerance for various types of failures. In this case, it can be the job of the reliable messaging system 10 to select an appropriate transport protocol and access network based on the reliability and delivery options specified.

Moreover, if operating conditions change, the control module 16 can instruct the communication subsystem 12 to switch transport protocols or access networks to optimize the performance and degree of reliability of the reliable messaging system 10 based on a pre defined set of criteria. For example, if the current network link for the network interface layer 44 changes, the control module 16 may examine a set of predefined criteria or rules in order to determine whether to effect a change at the transport layer 44. Such criteria may include an indication that a TCP protocol performs poorly on a wireless network link or that SMS is the preferred protocol for a cellular network link.

As a result, the reliable messaging system 10 provides the application 18 with a network and transport independent interface. Whereas traditional communication models compel an application itself to select and use underlying transport protocols, the reliable messaging system 10 of FIG. 1 allows the application 18 to become completely independent of communications semantics. Accordingly, the application 18 can communicate and host data across different types of networks and transports using a variety of different network or transport protocols.

Therefore, the reliable messaging system 10 can configure itself based on the input parameters specified by the application 18 using the APIs 20. In particular, the control module 16 can instantiate selected components of the reliability subsystem 14 and can configure the components of the reliability subsystem 14 and communication subsystems 12 with different algorithms or protocols. The control module 16 can switch fault tolerance schemes, network links, and protocols transparently to the application 18. Since different components of the reliable messaging system 10 may be instantiated and individually configured by the control module 16, the reliable messaging system 10 separates functional and non-functional code. In other words, the components of the reliability and communication subsystems 12 and 14, which comprise functional mechanisms for implementing various fault tolerance and performance policies, are distinct from the policy making control module 16.

Figure 5A:
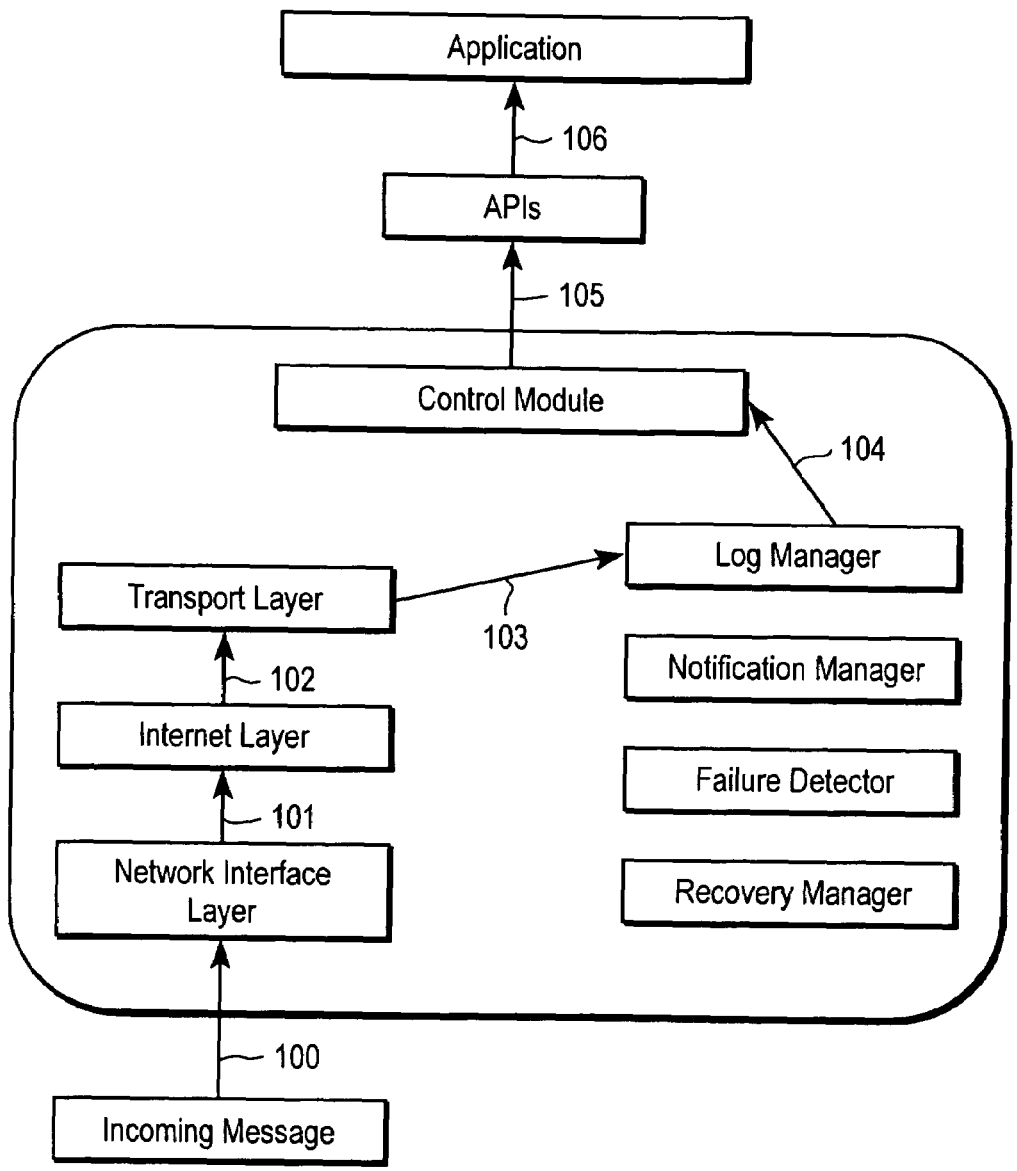
FIGS. 5a–5c illustrate communications between components of the reliable messaging system of FIG. 1.
Figure 5B:
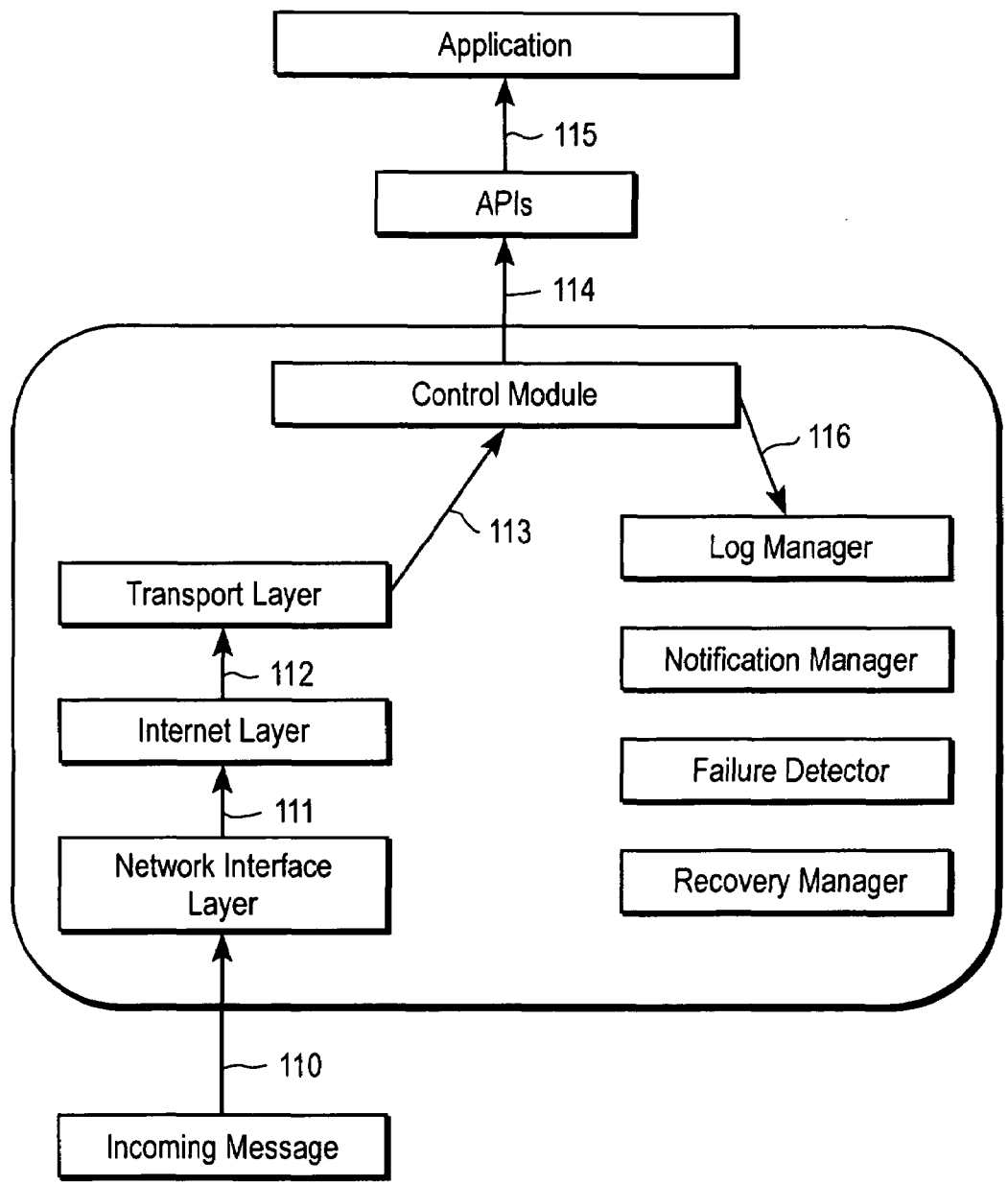
Figure 5C:
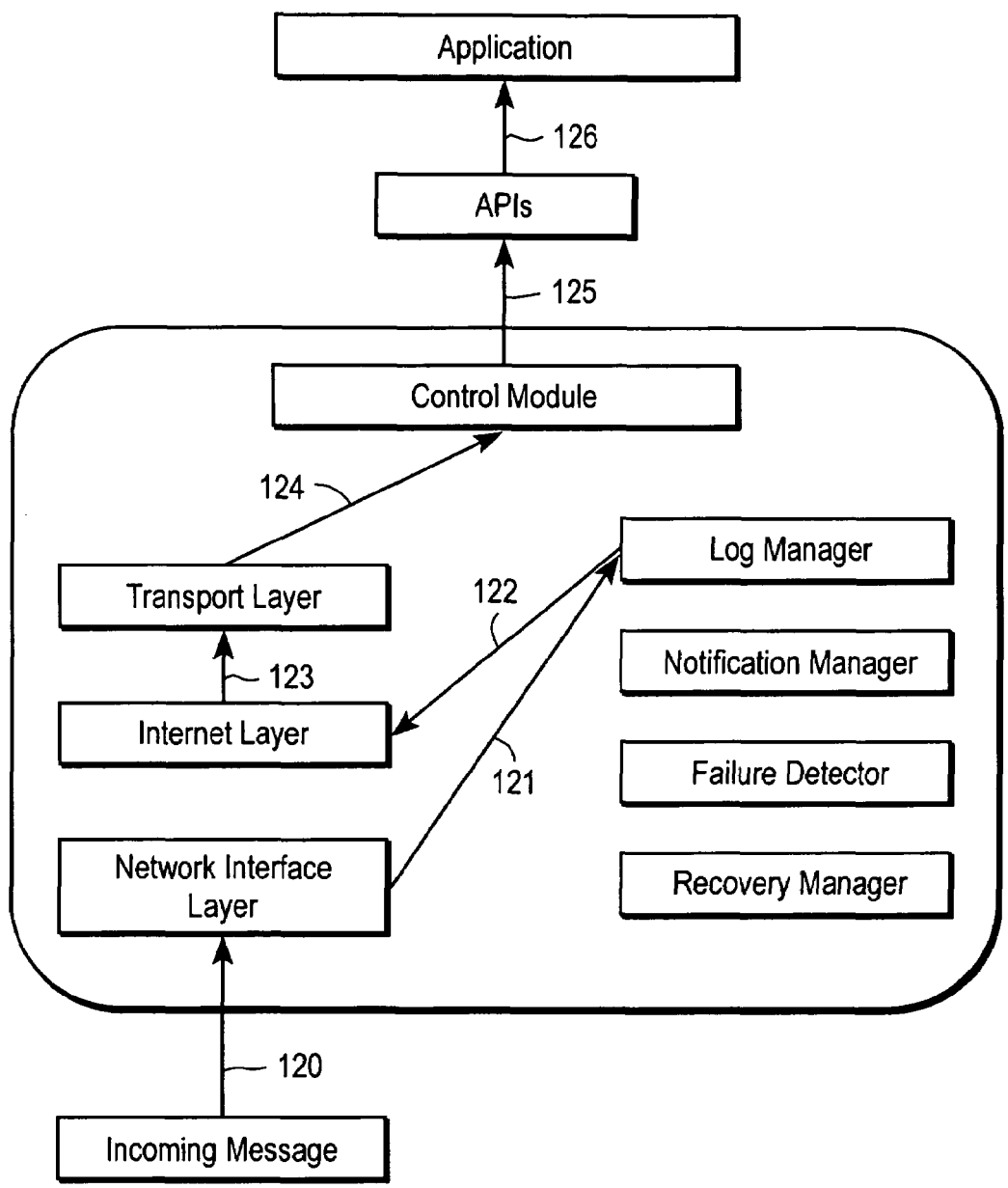

In addition to selecting and configuring components of the reliability and communication subsystems 14 and 12 for different instantiations of the reliable messaging system 10, the control module 16 can also direct the routing order for messages between the instantiated components of the reliable messaging system 10. For example, as shown in FIG. 5a, the control module can request that an incoming message received by the network interface layer at step 100 is routed first to the internet layer at step 101, then to the transport layer at step 102, then to the log manager module where it can be logged at step 103, then to the control module at step 104 and finally to the application at step 106 via the API's at step 105. Alternatively, as shown in FIG. 5b, the control module can request that, once an incoming message received by the network interface layer at step 110 is routed to the internet layer at step 111 and the transport layer at step 112, the message is to be delivered to the control module at step 113 and then to application at step 115 via the API's at step 114 before the message is delivered to the log manager module at step 116 for logging. Likewise, as shown in FIG. 5c, the control module can request that an incoming message received by the network interface layer at step 120 is routed first to the log manager module at step 121 and then to the internet layer at step 122, the transport layer 44 at step 123, the control module at step 124 and finally to the application at step 126 via the API's at step 125.

The control module 16 of FIG. 1 can also coordinate the execution of the components of the communication subsystem 12 and the reliability subsystem 14. For example, the control module 16 can act as a coordinator for all messages passed between the components of the reliable messaging system 10, such that different components can only communicate with each other through the control module 16. In other words, every communication between components of the reliable messaging system 10 must pass through the control module 16. Alternatively, the control module 16 can delegate coordination to the other components of the reliable messaging system 10 such that components can communicate directly with each other. In this case, the control module 16 acts as an observer and will intervene only to reconfigure the reliable messaging system 10.

For example, as described above, the failure detector module 48 can signal to the control module 16 that the application 18 has failed. The control module 16 can then direct the notification manager module 50 to notify remote network entities of the application process failure and the recovery manager module 52 to ensure delivery of incoming or outgoing messages. Alternatively, the architecture of the reliable messaging system 10 also allows the failure detector module 48 to communicate directly with the notification manager module 50 and the recovery manager module 52 in order to mask the failure of the application 18.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

We claim:

1. A configurable reliable messaging system comprising:
   a communication subsystem capable of configurably transmitting and receiving a message across a network using at least one of a plurality of network links, a plurality of internet protocols and a plurality of transport protocols;
   a reliability subsystem capable of configurably logging said message, detecting a plurality of failures, notifying a remote entity interconnected with said configurable reliable messaging system via said network of said plurality of failures, and recovering from said plurality of failures, wherein said reliability subsystem includes a log manager module capable of configurably logging said message; and
   a control module capable of configuring said communication subsystem and said reliability subsystem based on a set of input parameters in order to achieve different levels of reliability with respect to the communication subsystem.

2. The system of claim 1 wherein said configurable reliable messaging system interfaces with an application via said control module using a set of application programming interfaces for specifying said input parameters.

3. The system of claim 2 wherein said communication subsystem includes at least one of:
   a network interface layer that is configurable for accessing a requested network link of said plurality of network links;
   an internet layer that is configurable for moving said message across said network using a requested internet protocol of said plurality of internet protocols; and
   a transport layer that is configurable for managing data communication with said application using a requested transport protocol of said plurality of transport protocols,
   wherein said control module can separately configure said network interface layer, said internet layer and said transport layer based on said input parameters.

4. A configurable reliable messaging system comprising:
   a communication subsystem capable of configurably transmitting and receiving a message across a network using at least one of a plurality of network links, a plurality of internet protocols and a plurality of transport protocols;
   a reliability subsystem capable of configurably logging said message, detecting a plurality of failures, notifying a remote entity interconnected with said configurable reliable messaging system via said network of said plurality of failures, and recovering from said plurality of failures, wherein said reliability subsystem includes and at least one of:
   a log manager module capable of configurably logging said message;
   a configurable failure detector module capable of detecting a requested failure of said plurality of failures;
   a configurable notification manager module capable of notifying said remote entity of said requested failure; and
   a configurable recovery manager module capable of recovering from said requested failure; and
   a control module capable of configuring said communication subsystem and said reliability subsystem based on a set of input parameters in order to achieve different levels of reliability with respect to the communication subsystem, wherein the configurable reliable messaging system interfaces with an application via the control module using a set of application programming interfaces for specifying the input parameters, and further wherein the communication subsystem includes at least one of: a network interface layer that is configurable for accessing a requested network link of the plurality of network links, an internet layer that is configurable for moving the message across the network using a requested internet protocol of the plurality of internet protocols, and a transport layer that is configurable for managing data communication with the application using a requested transport protocol of the plurality of transport protocols,
   wherein the control module can separately configure the network interface layer, the internet layer and the transport layer based on the input parameters, and further wherein said control module can selectively instantiate and configure said log manager module, failure detector module, notification manager module and recovery manager module based on said input parameters.

5. The system of claim 4 wherein said input parameters comprise at least one of a reliability option, a performance option, a network stack option, a delivery option and a synchrony option.

6. The system of claim 5 wherein said reliability option includes a failure detection parameter for specifying whether to detect said requested failure, a recovery parameter for specifying whether to recover from said requested failure, a notification parameter specifying whether to notify said remote entity of said requested failure and a message logging parameter specifying a device connected with said network for logging said message.

7. The system of claim 5 wherein said performance option includes at least one of a parameter specifying a mean of wait times for user interface events of said application and a parameter specifying a variance of wait times for user interface events of said application.

8. The system of claim 5 wherein said network stack option includes at least one of a parameter specifying said requested transport protocol, a parameter specifying said requested internet protocol and a parameter specifying said requested network link.

9. The system of claim 5 wherein said delivery option includes at least one of a first parameter for specifying at least once delivery of said message, a second parameter for specifying at most once delivery of said message, and a third parameter for specifying exactly once delivery of said message.

10. The system of claim 5 wherein said synchrony option includes at least one of a parameter for specifying asynchronous operation of said configurable reliable messaging system and a parameter for specifying synchronous operation of said configurable reliable messaging system.

11. The system of claim 5 wherein said application can specify said input parameters on at least one of a per message basis and a per message class basis.

12. A method for configuring a reliable messaging system that includes a control module, a communication subsystem having communication components capable of configurably transmitting and receiving a message across a network using at least one of a plurality of network links, a plurality of internet protocols and a plurality of transport protocols, and a reliability subsystem having reliability components capable of configurably logging said message, detecting a plurality of failures, notifying a remote entity interconnected with said configurable reliable messaging system via said network of said plurality of failures, and recovering from said plurality of failures, the method comprising:

using said control module, selecting a group of said reliability components for an one of multiple implementations of said reliable messaging system based on a set of input parameters, where the multiple implementations achieve different levels of reliability;

instantiating said communication components and said selected group of reliability components;

using said control module, configuring said communication components and said selected group of reliability components, wherein configuring said reliability components includes configuring a log manager module for logging said message; and using said control module, determining an order for routing messages between said set of components based on said set of input parameters.

13. The method of claim 12 further comprising interfacing said reliable messaging system with an application using a set of application programming interfaces for specifying said input parameters.

14. The method of claim 13 wherein said configuring said communication components includes at least one of:

configuring a network interface layer for accessing a requested network link of said plurality of network links;

configuring an internet layer for moving said message across said network using a requested internet protocol of said plurality of internet protocols; and configuring a transport layer for managing data communication with said application using a requested transport protocol of said plurality of transport protocols.

15. A method for configuring a reliable messaging system that includes a control module, a communication subsystem having communication components capable of configurably transmitting and receiving a message across a network using at least one of a plurality of network links, a plurality of internet protocols and a plurality of transport protocols, and a reliability subsystem having reliability components capable of configurably logging said message, detecting a plurality of failures, notifying a remote entity interconnected with said configurable reliable messaging system via said network of said plurality of failures, and recovering from said plurality of failures, the method comprising:

using said control module, selecting a group of said reliability components for an one of multiple implementations of said reliable messaging system based on a set of input parameters, where the multiple implementations achieve different levels of reliability;

instantiating said communication components and said selected group of reliability components;

using said control module, configuring said communication components and said selected group of reliability components, wherein said configuring said communication components includes at least one of: configuring a network interface layer for accessing a requested network link of said plurality of network links, configuring an internet layer for moving said message across said network using a requested internet protocol of said plurality of internet protocols, and configuring a transport layer for managing data communication with said application using a requested transport protocol of said plurality of transport protocols, and wherein said configuring said reliability components includes at least one of:

configuring a log manager module for logging said message;

configuring a failure detector module for detecting a requested failure of said plurality of failures;

configuring a notification manager module for notifying said remote entity of said requested failure; and configuring a recovery manager module for recovering from said requested failure;

using said control module, determining an order for routing messages between said set of components based on said set of input parameters; and interfacing said reliable messaging system with an application using a set of application programming interfaces for specifying said input parameters.

16. The method of claim 15 wherein said input parameters comprise at least one of a reliability option, a performance option, a network stack option, a delivery option and a synchrony option.

17. The method of claim 16 wherein said reliability option includes a failure detection parameter for specifying whether to detect said requested failure, a recovery parameter for specifying whether to recover from said requested failure, a notification parameter specifying whether to notify said remote entity of said requested failure and a message logging parameter specifying a device connected with said network for logging said message.

18. The method of claim 16 wherein said performance option includes at least one of a parameter specifying a mean of wait times for user interface events of said application and a parameter specifying a variance of wait times for user interface events of said application.

19. The method of claim 16 wherein said network stack option includes at least one of a parameter specifying said requested transport protocol, a parameter specifying said requested internet protocol and a parameter specifying said requested network link.

20. The method of claim 16 wherein said delivery option includes at least one of a first parameter for specifying at least once delivery of said message, a second parameter for specifying at most once delivery of said message, and a third parameter for specifying exactly once delivery of said message.

21. The method of claim 16 wherein said synchrony option includes at least one of a parameter for specifying asynchronous operation of said configurable reliable messaging system and a parameter for specifying synchronous operation of said configurable reliable messaging system.

22. The method of claim 16 wherein said application can specify said input parameters on at least one of a per message basis and a per message class basis.

* * * * *